United States Patent [19]

MacPhee

[11] 4,159,651

[45] Jul. 3, 1979

[54] FLEXURE POSITIONING MECHANISM

[75] Inventor: John MacPhee, Rowayton, Conn.

[73] Assignee: Baldwin-Gegenheimer Corporation, Stamford, Conn.

[21] Appl. No.: 795,368

[22] Filed: May 9, 1977

[51] Int. Cl.² .......................................... F16H 25/08
[52] U.S. Cl. ..................................... 74/55; 74/99 A; 101/365
[58] Field of Search .......... 74/55, 99 R, 99 A, 100 R, 74/100 P, 101, 110; 101/365; 292/10, 92, 164, 171, 174, DIG. 16

[56] References Cited

U.S. PATENT DOCUMENTS

| 447,964 | 3/1891 | Mentzel | 74/55 |
|---|---|---|---|
| 1,105,252 | 7/1914 | Carstens | 292/92 |
| 2,630,504 | 3/1953 | Burch et al. | 74/100 P X |
| 2,878,682 | 3/1959 | Lipfert | 74/100 |
| 2,898,855 | 8/1959 | Richter | 101/365 X |
| 3,779,165 | 12/1973 | Abendroth et al. | 101/365 |

FOREIGN PATENT DOCUMENTS

| 2406940 | 8/1975 | Fed. Rep. of Germany | 101/365 |
|---|---|---|---|
| 2530109 | 1/1977 | Fed. Rep. of Germany | 101/365 |
| 2539846 | 3/1977 | Fed. Rep. of Germany | 101/365 |
| 364189 | 1/1932 | United Kingdom | 74/100 P |
| 446151 | 4/1936 | United Kingdom | 292/174 |
| 1434068 | 4/1976 | United Kingdom | 101/365 |

Primary Examiner—Lawrence J. Staab

[57] ABSTRACT

A rectilinear positioning mechanism for precisely controlling the rectilinear position of an output member. The rectilinear positioning mechanism of this invention includes a relatively thin beam which is flexible particularly along its longitudinal length. The flexible beam is fixed against movement at one end while the other end is free to move in the longitudinal direction.

There is an input mechanism located between the ends of the flexible beam for deflecting the center of the flexible beam in a controlled, precise manner to thereby change the position of the free end of the beam.

The mechanism has utility as a positioning means generally and for positioning the ends of segments of a metering blade with respect to the ink fountain roller in an ink fountain assembly.

14 Claims, 12 Drawing Figures

PLAN VIEW

FRONT VIEW

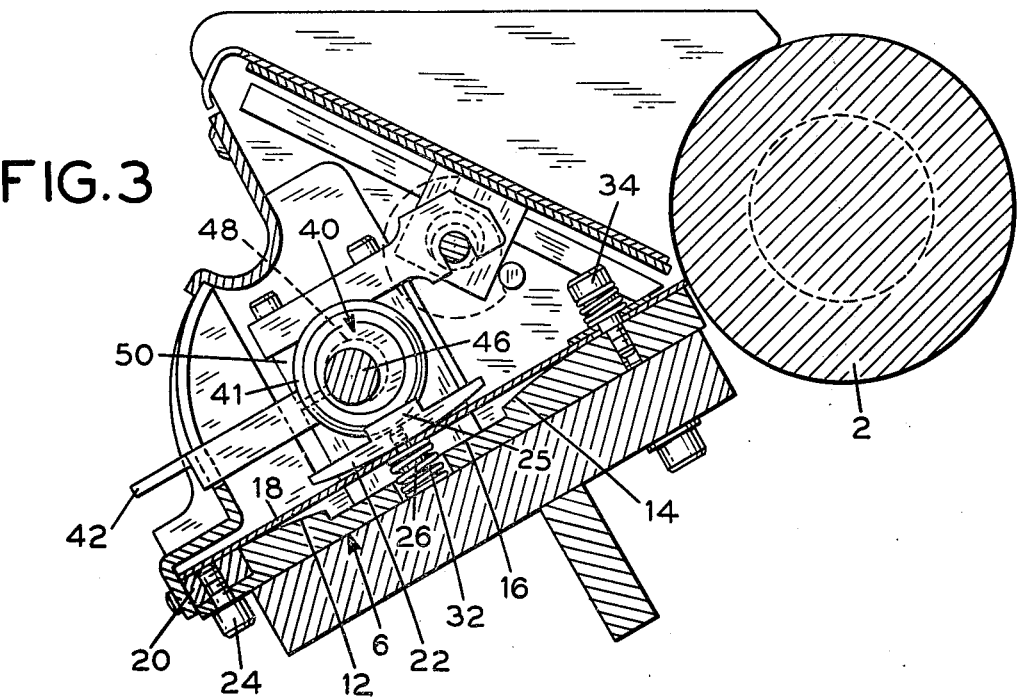
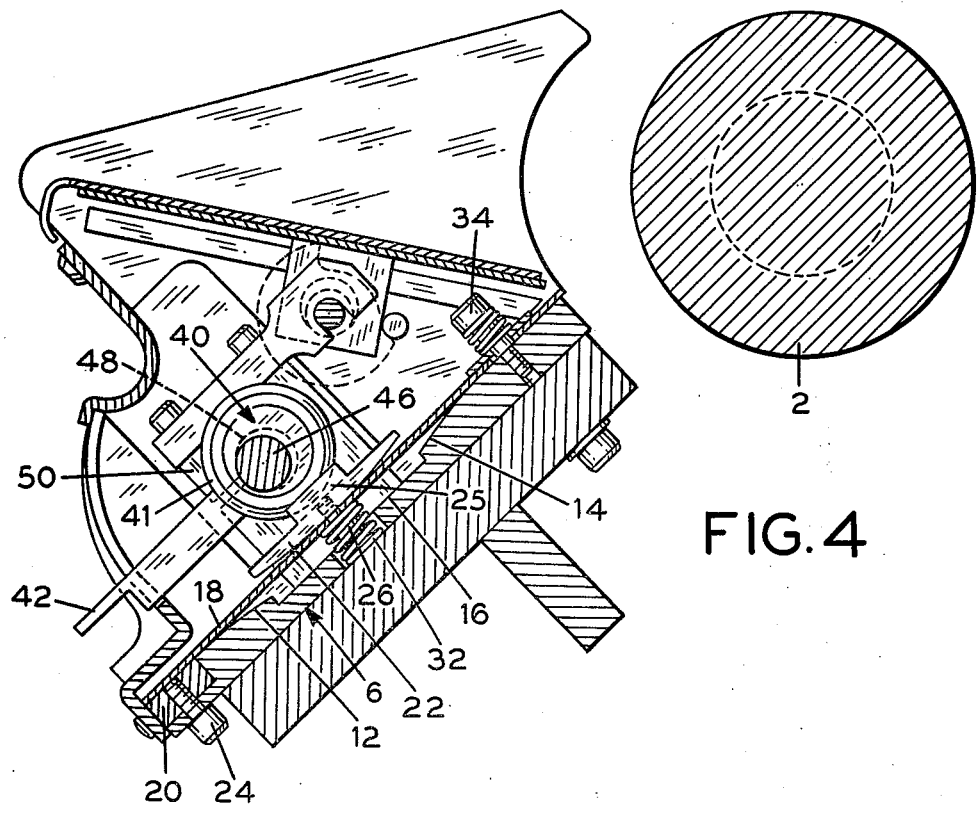

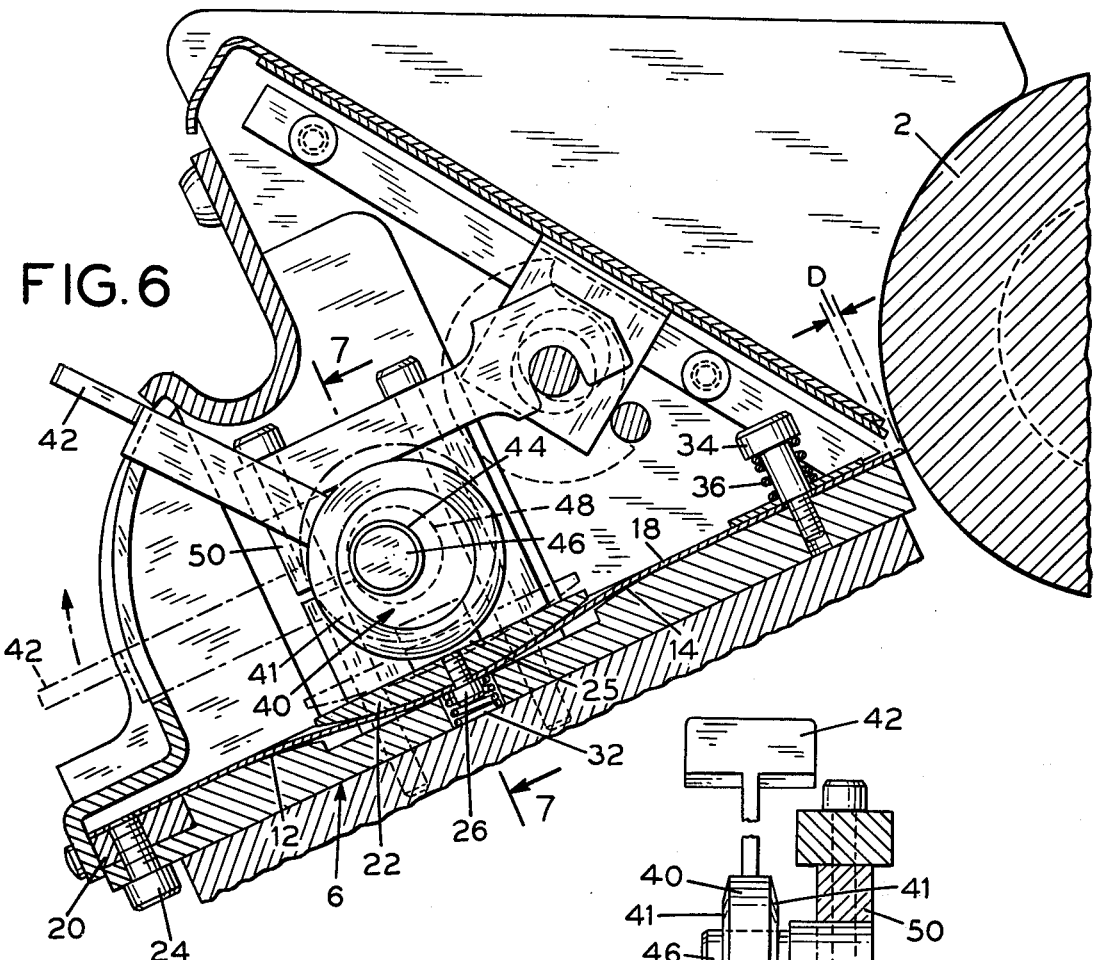
FIG.6
FIG.7
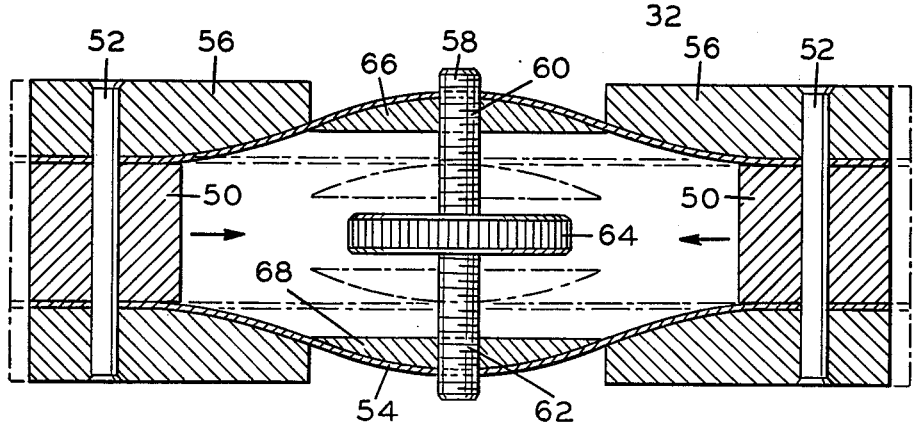
FIG.10

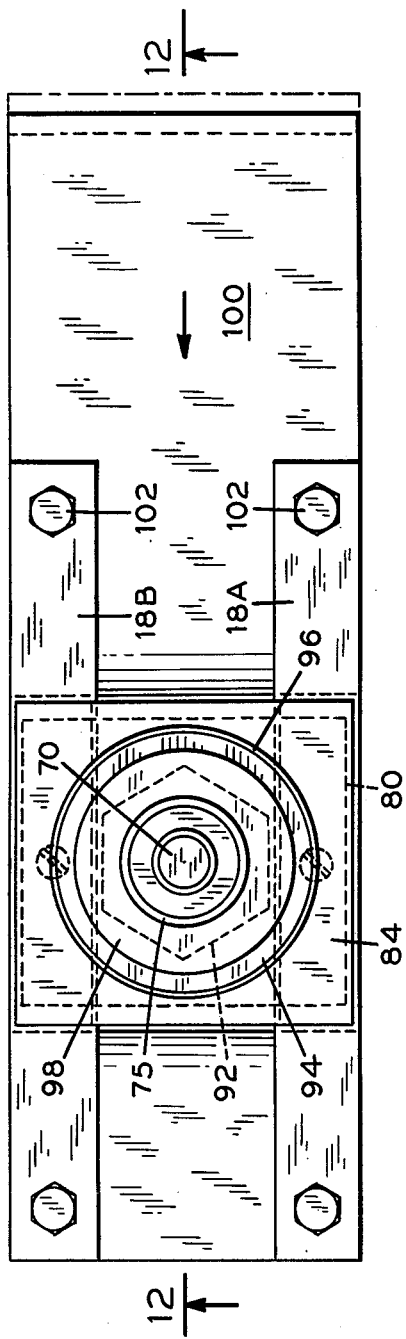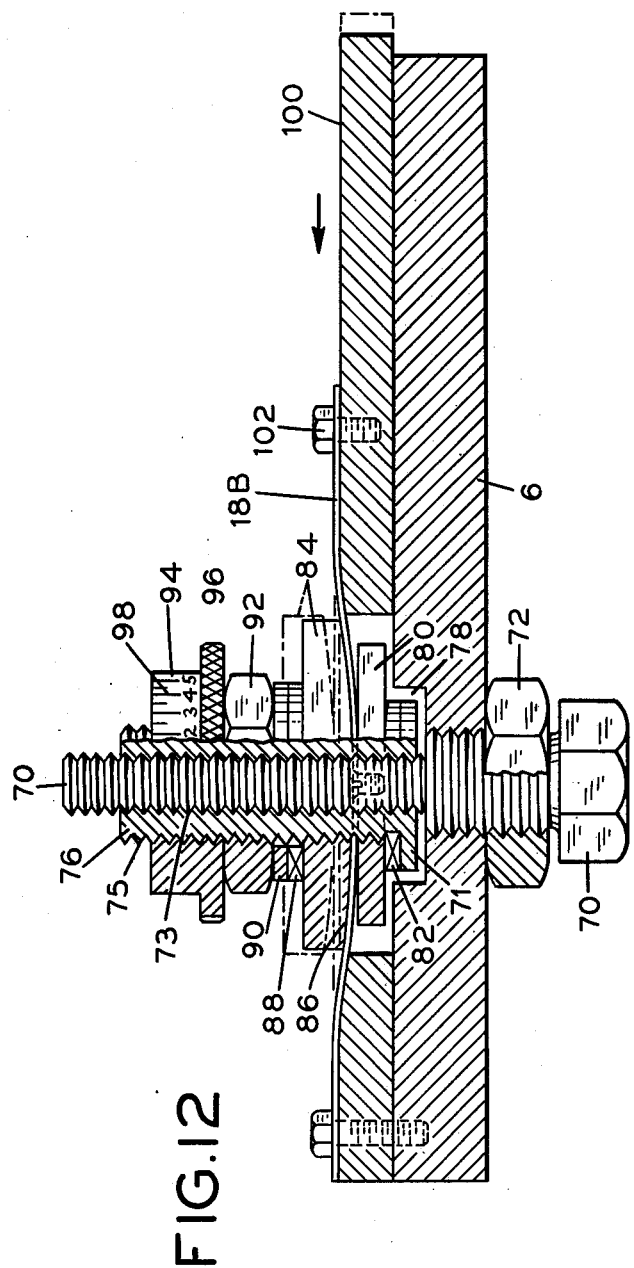

FLEXURE POSITIONING MECHANISM

BACKGROUND OF THE INVENTION

This invention relates to a new and novel precision rectilinear positioning mechanism.

More particularly, the present invention relates to a positioning mechanism with little or no lost motion which is wear-resistant, low in cost and reliable in operation. The positioning mechanism is constructed so that there is significant restraining forces against movement normal to the desired rectilinear movement.

There are a variety of situations where an accurate positioning mechanism of the type herein involved would be useful.

For example, in certain optical systems a positioning means is required to move a lens along a path normal to the image plane. Another environmental use would be to meter the rate of flow in a spray type applicator system by varying the width of a slot through which fluid to be sprayed is forced or pumped. Another need for positioning means is in machine tools where it is necessary to accurately position a cutting tool, for example, with respect to a workpiece. Such a machine tool could be a lathe where the cutting tool is positioned normal to the workpiece.

Still another environment for the invention is in printing presses. In printing presses there is a member which serves as a metering means which is positioned with respect to an ink roller. In such an environment the metering member which may be segmented, is positioned with respect to the roller to remove excess ink from the roller. In this instance, the gap between the metering member and the roller determines the rate ink is transformed or metered to the adjacent roller. The metering can be controlled by varying the position of the individual metering segments with respect to the roller.

In all the foregoing environments it is essential that the positioning be done in a precise and controlled manner.

BACKGROUND OF THE PRIOR ART

There are, of course, in the prior art a variety of different types of mechanisms for rectilinearly positioning a member with respect to another member.

One type of such mechanism is referred to as the precision lead screw. In this type of mechanism there is an output member which is constrained against lateral or sideways movement by keyways. The output member is threaded and in engagement with a threaded precision screw. The precision lead screw which can be mounted in a bearing usually has a handle or the like which is turned to thereby impart rectilinear movement by the keyway construction. This type of construction is found in machine tools such as milling machines and lathes.

In such a construction one turn of the lead screw will produce about 100 mils to 200 mils of rectilinear movement of the output member. The difficulty with such mechanisms is that they have a relatively large amount of backlash e.g. ten (10) mils particularly after wear has occurred. Accordingly, with this type of mechanism accurate positioning is not always possible.

Another type of positioning mechanism found in the prior art utilizes a differential lead screw. The screw has two different thread pitches, a coarse and a fine pitch thread. With this type of mechanism, however, there is even more backlash than with the single pitch precision screw, the stroke of the output member is less and, of course, guideways are required to prevent lateral movement of the output member.

Another type of positioning mechanism is the cam operated mechanism. In this type of mechanism a cam is rotatably positioned between a fixed member and movable member which in turn is connected to the output member. In this type of mechanism, the cam is provided with a handle or the like. Movement of the handle rotates the cam. Rotation of the cam will result in rectilinear movement of the output member.

These are several disadvantages to the cam type of structure. For example, a cam type mechanism unlike the precision lead screw device is limited in stroke i.e. the stroke is limited to some fraction of the overall dimension of the cam. There is also a problem of backlash caused in part by the machine tolerances and by the fact that the cam-follower contacting surfaces can only move the output member in one direction. For this reason a spring or some other type of return mechanism is needed. This type of device also requires a guideway to control movement of the output member.

Another type of mechanism sometimes used is a toggle type mechanism. This type of mechanism usually consists of a base member on which the output member is slidably mounted. Pivotally attached to the base member and to the output member are links or lever members. The link members are pivoted at one end to the fixed base member and the movable output member and at the other end the links can be pivotally attached to one another. The point where the links are joined together can be moved up and down to cause rectilinear movement of the output member. This type machanism has the advantage that the input movement can be caused by a variety of different means e.g. cam or precision lead screw. Another advantage of this type of construction is that with properly designed links the output member will be constrained against lateral movement thus eliminating the need for guideways.

A major disadvantage of this type of construction is that considerable backlash or play can occur in the pivotal connections between the links and the base between the links and between the links and the movable output member. Such backlash prevents accurate positioning of the output member.

OBJECTS OF THE INVENTION

With the foregoing in mind it is an object of this invention to provide a positioning mechanism which is low in cost and reliable in operation.

Another object of this invention is to provide a positioning mechanism for rectilinearly positioning an output member in a controlled and precise manner with respect to the force applied by an input member.

Another object of this invention is to provide a positioning mechanism including a flexure beam which upon flexing can cause rectilinear movement of an output member to thereby position the output member with respect to a stationary member.

A still further object of this invention is to provide a flexure mechanism which can rectilinearly position an output member with respect to another member without the use of guideways to prevent lateral movement of the flexure mechanism.

A still further object of this invention is to provide a positioning member for rectilinearly positioning an output member wherein the positioning member includes a flexible beam member which is fixed at one end and free at the other and wherein the flexible beam is engaged intermediate its fixed and free ends by an input member which flexes the beam to cause movement of the free end of the flexible beam member.

Another object of this invention is to provide a positioning mechanism for a segmental metering member in an ink fountain assembly which includes a plurality of relatively thin flexure beams which when deflected intermediate their ends rectilinearly positions the ends of the segmental metering member with respect to an ink fountain roller.

Additional objects and advantages of the invention will be set forth in the description which follows and in part will be obvious from the description. The object and advantages being realized and obtained by means of the instrumentation, parts and apparatus being particularly pointed out in the appended claims.

The invention consists of the novel parts, steps, constructions and improvements shown and described.

BRIEF DESCRIPTION OF THE INVENTION

The positioning mechanism of the present invention includes a relatively thin flexible beam member which can be deflected in its longitudinal direction. The flexible beam can be made of any convenient material such as spring steel which has the necessary characteristics of strength and elasticity so that the beam will return to its original position despite repeated flexures or deflections.

The flexure beam is constructed so that one end can move in the longitudinal direction but is restrained against movement in any other direction. The other end of the beam is fixed against any movement. The flexure beam is supported in a manner so that when a portion of the beam intermediate to its ends is subjected to an input force the flexure beam will be deflected from its normal position. The deflection of the flexure beam will cause the free end of the flexure beam to move a small rectilinear distance. The input mechanism controls the deflection of the beam and hence the movement of the free end of the flexure beam in a precise manner.

In a preferred embodiment of the invention the flexure mechanism is used in connection with a metering member assembly having a segmental metering member i.e. a metering member made up of many individual side-by-side segments. In such an arrangement each segment of the blade is individually positioned with respect to an ink fountain roller to control the ink film thickness. In this embodiment the forces developed in the return direction are important to release the free end of the flexure beam from dried ink.

The present invention provides a positioning mechanism for each of the blade segments which permits highly accurate control thereof and which substantially eliminates the problem of backlash and does not require guideways or the like to prevent transverse movement of the flexible beam metering member segements.

In accordance with this invention the input member which forces the flexure beam to be deflected or flexed from its normal position has several embodiments.

The accompanying drawings which are incorporated in and constitute part of this specification illustrate an embodiment of the invention and together with the description serve to explain the principles of the invention.

OF THE DRAWINGS

FIG. 3 is a section taken generally along line 3—3 of FIG. 2 showing one of the metering member segments in contact with the ink roll.

FIG. 4 is a section similar to FIG. 3, with the assembly moved from the ink roll, showing the assembly in cleaning position.

FIG. 6 is a transverse view of the assembly with the operating handle lifted accurately to thereby retract the flexible beam or metering member.

FIG. 7 is a section taken along line 7—7 of FIG. 6, showing the cam member in position in the track.

FIG. 10 is a plan view in section of a modified construction wherein diametrically opposed output movements are affected by the rotation of a single actuating member.

FIG. 11 is a plan view of another embodiment in which the output movement is actuated by a micrometer-type dial.

FIG. 12 is a vertical section taken along line 12—12 of FIG. 11.

FIGS. 1 and 2 show the metering means in a position adjacent the fountain roll so as to be able to perform a metering function.

Figure 1:
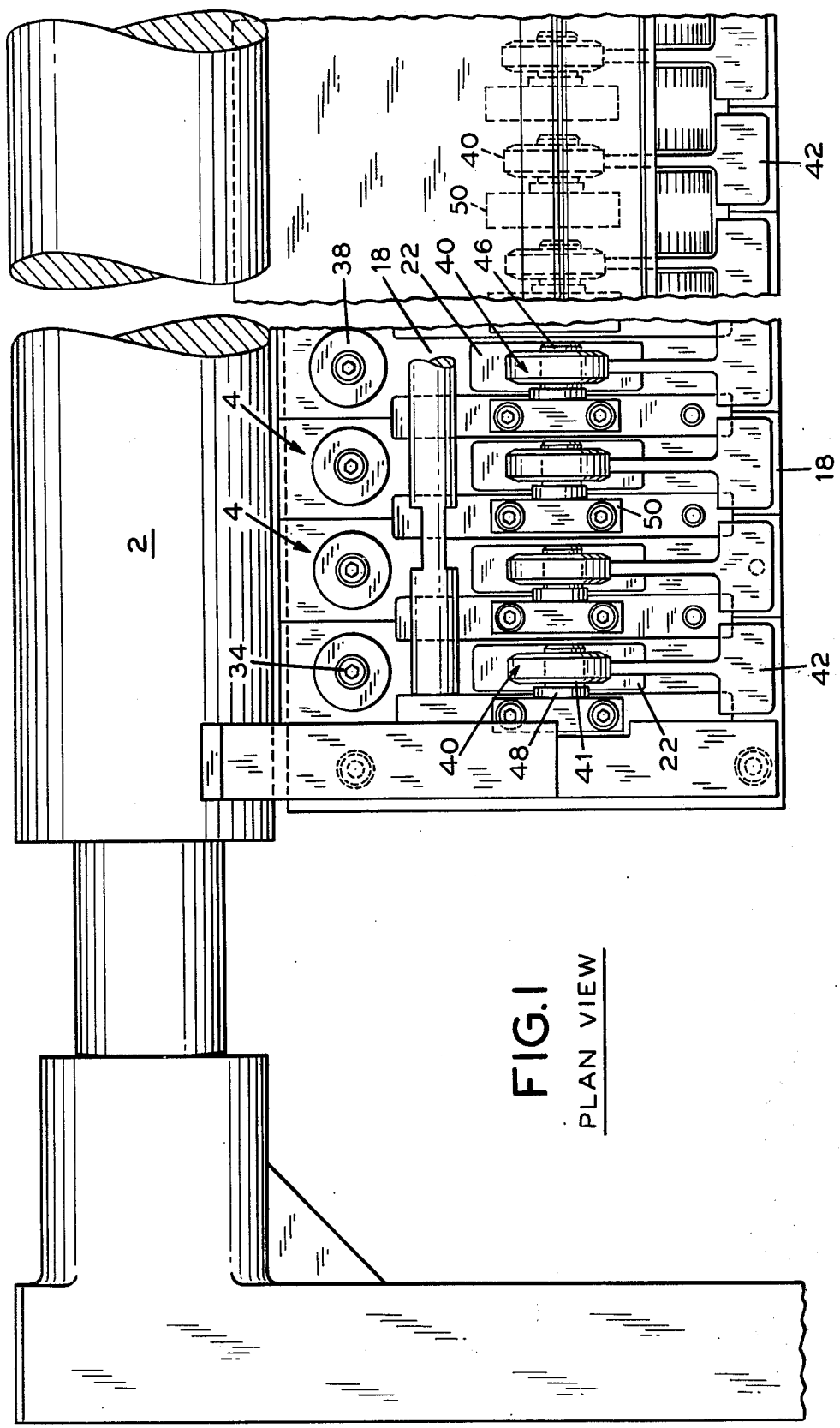
FIG. 1 is a plan view of the left-hand portion of an ink fountain assembly with parts broken away for a better showing.
Figure 2:
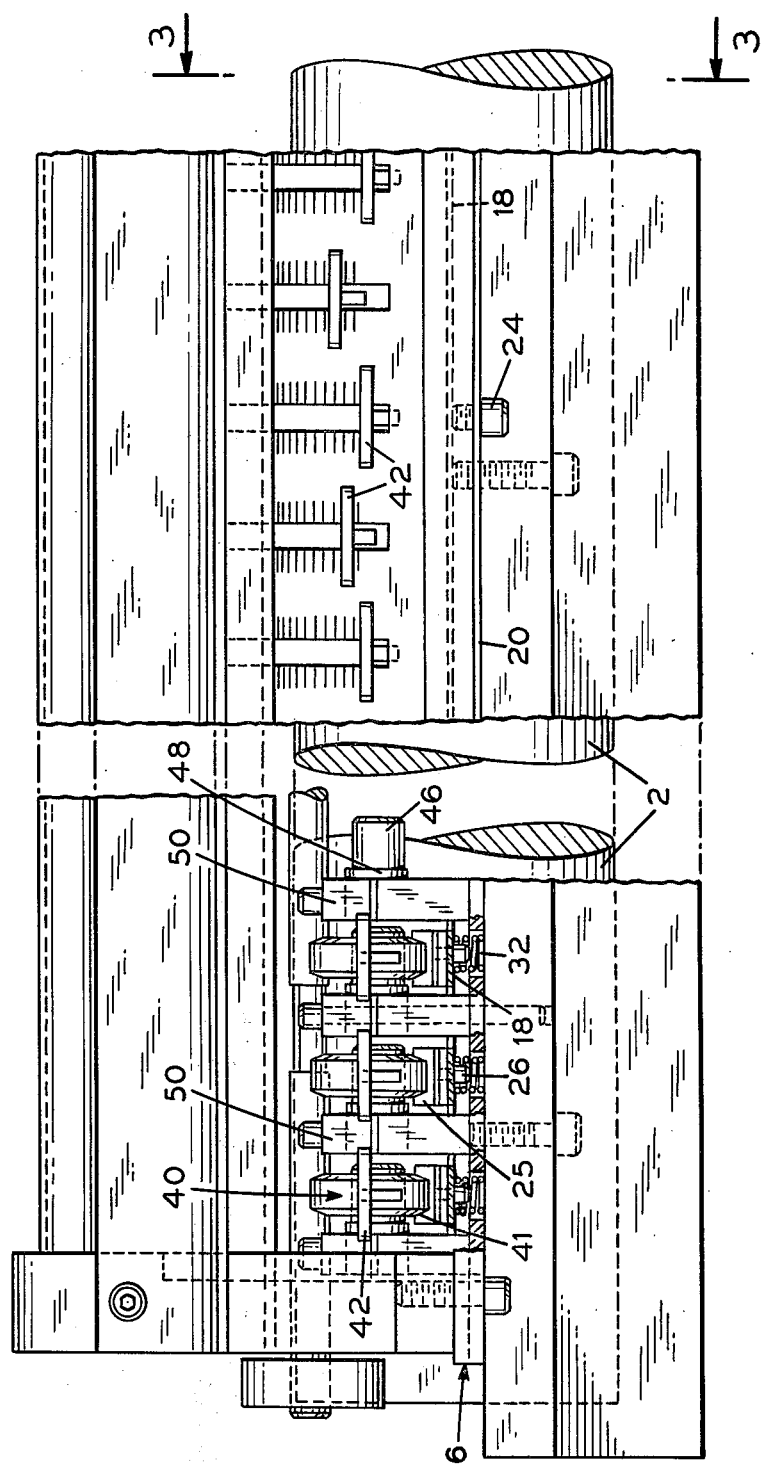
FIG. 2 is a front elevational view of the same portion of the assembly shown in FIG. 1 also with parts broken away.

As shown in FIGS. 1 and 2 there is an ink fountain roller 2 having positioned generally adjacent thereto a plurality of individual metering member segments 4. The metering member segments are to be positioned precise distances with respect to the fountain roller to accurately control the ink film thickness by means of the present invention.

Figure 5:
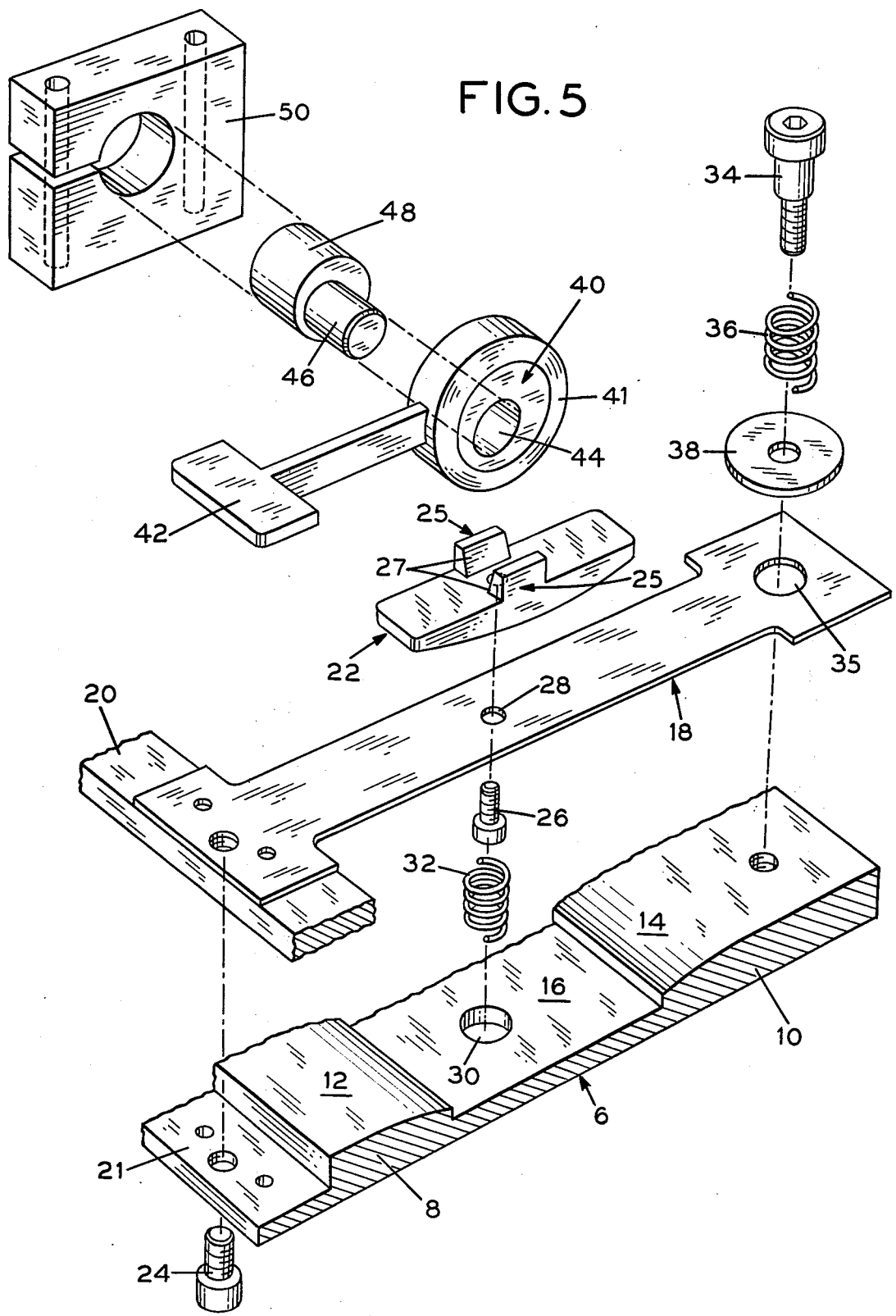
FIG. 5 is an exploded view of the components of the assembly.

The positioning mechanism of the present invention is illustrated in FIGS. 3 and 4 and particularly in the exploded view of FIG. 5.

As shown in FIG. 5 there is a base member 6 having spaced apart contoured blocks 8 and 10. The contoured blocks are shaped so that they have curved surfaces 12 and 14 which curve or slope toward one another. There is a space 16 between the contour blocks 8 and 10.

Positioned in engagement with the base member 6 is a relatively thin flexure beam or member 18 which is flexible at least along its longitudinal length. The flexure beam or member 18 can be made of any suitable material having the necessary strength and elasticity so that it can be flexed a plurality of times without becoming fatigued. For example, spring steel is appropriate. The return force of the flexible beam is sufficient to release the free end of the flexible beam from dried ink which can cause sticking of the free end.

In accordance with this form of the invention one end of the flexure member is fixed against movement while the other end of the flexure member is free for rectilinear movement. As embodied, one end of the flexure beam is connected to a stiffener bar 20 adapted to be received on a shelf 21 of the base member 6. The stiffener bar 20 extends the length of the ink fountain and all of the flexure beams 18 are fastened thereto in any convenient fashion. The stiffener bar prevents sideways motion of the flexure beam. This end of the flexure member 18 is attached to the base member 6 by means of the threaded bolt 24 which is in threaded engagement with the stiffener bar 20 of the flexure beam 18.

In accordance with this invention means is provided for transmitting input force to the flexure beam between its ends to thereby deflect the flexure beam.

As embodied, this means includes a presser foot 22 having tracks or guides 25 in the top surface thereof. The tracks or guides 25 have inner surfaces 27 which are tapered. The presser foot 22 is maintained in engagement with flexible beam 18 by the bolt 26 which passes through an opening 28 in the flexible beam and threads into the presser foot 22. Located beneath the flexure beam 18 and positioned in an aperture 30 in the base member 6 is a spring 32. The spring 32, which is optional, can assist in returning the flexure beam to its original position after the input force is removed.

In accordance with this invention means is provided for restraining the movement of the free end of the flexure beam so that the free end will move only rectilinearly.

As embodied, this means includes the stiffener bar 20 attached to the flexible beam 18 and its relationship with the shelf 21 on the base member 6 which was previously described above. In addition, there is a bolt 34 adapted to be threaded into the block 10 on the base 6. Surrounding the threaded bolt 34 is a spring 36 and a washer 38. The bolt 34, spring 36 and washer 38 cooperate to prevent any tendency of the free end of the flexure beam to move upwardly. It will be understood that the opening 35 in the flexure beam is somewhat larger than the diameter of the bolt 34 to allow rectilinear movement of the free end of the flexure beam.

In accordance with the invention input force means is provided to deflect the flexure beam between its ends in order to cause rectilinear movement of the free end of the flexure beam or member. As embodied, this means includes an eccentric 40 having an operating handle 42. The eccentric 40 has a circular aperture 44 therein for receipt of the stub shaft 46. The stub shaft 46 extends from the eccentric base 48 which is mounted within the split block 50. Part of the outer surfaces of eccentric 40 is tapered as shown at 41.

The relationship between the eccentric 40 and the guides or tracks 25 is illustrated in FIG. 7. As can be seen there the presser foot 22 and hence the guides or tracks 25 are fixed with respect to the base member 6 will maintain the cam member in operative position on the tracks 25 and prevent it from becoming disengaged from the stub shaft 46. In addition, the tapered surface 41 of the eccentric are in engagement with the tapered surface 27 of the tracks 25 to provide self-locking for these elements.

FIGS. 3 and 6 illustrate the invention in operation. Thus referring specifically to FIG. 6 the operating handle 42 (shown in phantom lines) is in the down position so that the low portion of the eccentric 40 is adjacent the presser foot 22. As shown in phantom, the presser foot is in its normal undeflected position caused by the elasticity of the flexure beam 18 and the return spring 32.

When, however, the handle 42 is moved to the full line position, the high point of the cam 40 will cause deflection of the flexure beam through the input force applied to the presser foot 22 to move the presser foot 22 and the flexure beam to the full line position. The deflection of the flexure beam is limited by the depth of the recess 16 in the base member 6.

As previously indicated, the movement of the free end of the flexure beam is rectilinear only. The total amount of rectilinear distance moved by the free end of the flexure beam is designated "D" and is exaggerated since the construction of the present invention permits very fine adjustments of the position of the free end of the flexure beam which is in the order of mils.

Figure 8:
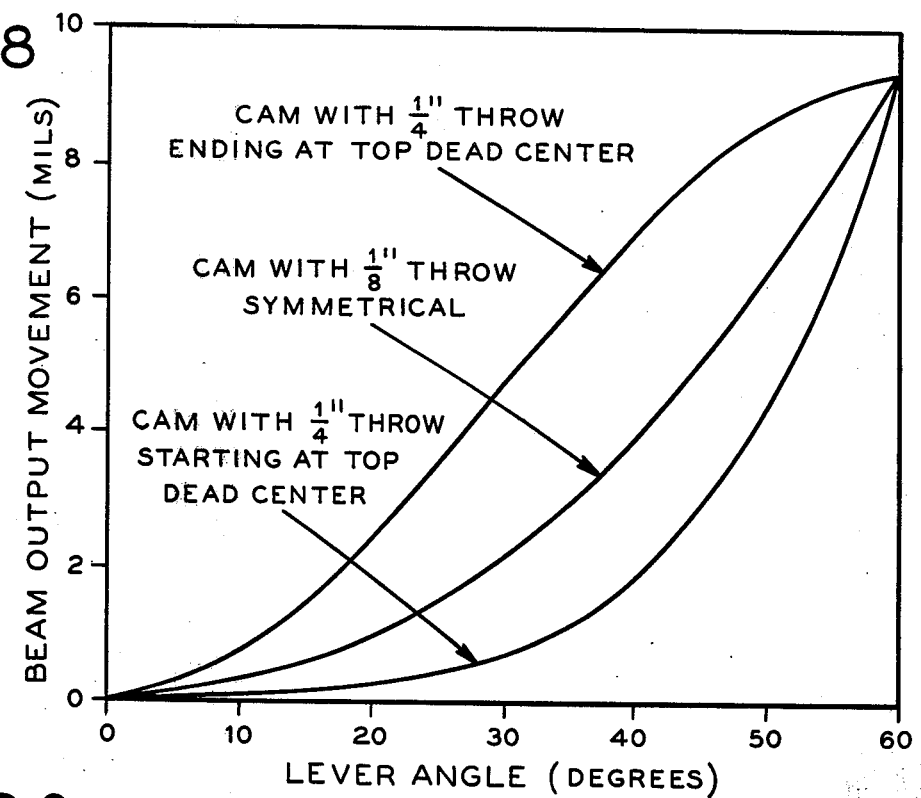
FIG. 8 is a graph showing the relationship between the actuating lever angle and the output movement.

FIG. 8 is a graph illustrating the lever angle in degrees for three possible cam arrangements and the resultant output movement in mils.

As shown, there are three curves relating the lever angle beam output movement in mils. The three curves are cams with one-quarter inch throw ending at top dead center, cam with one-eighth inch throw symmetrical and cam with one-quarter inch throw starting at top dead center.

Figure 9:
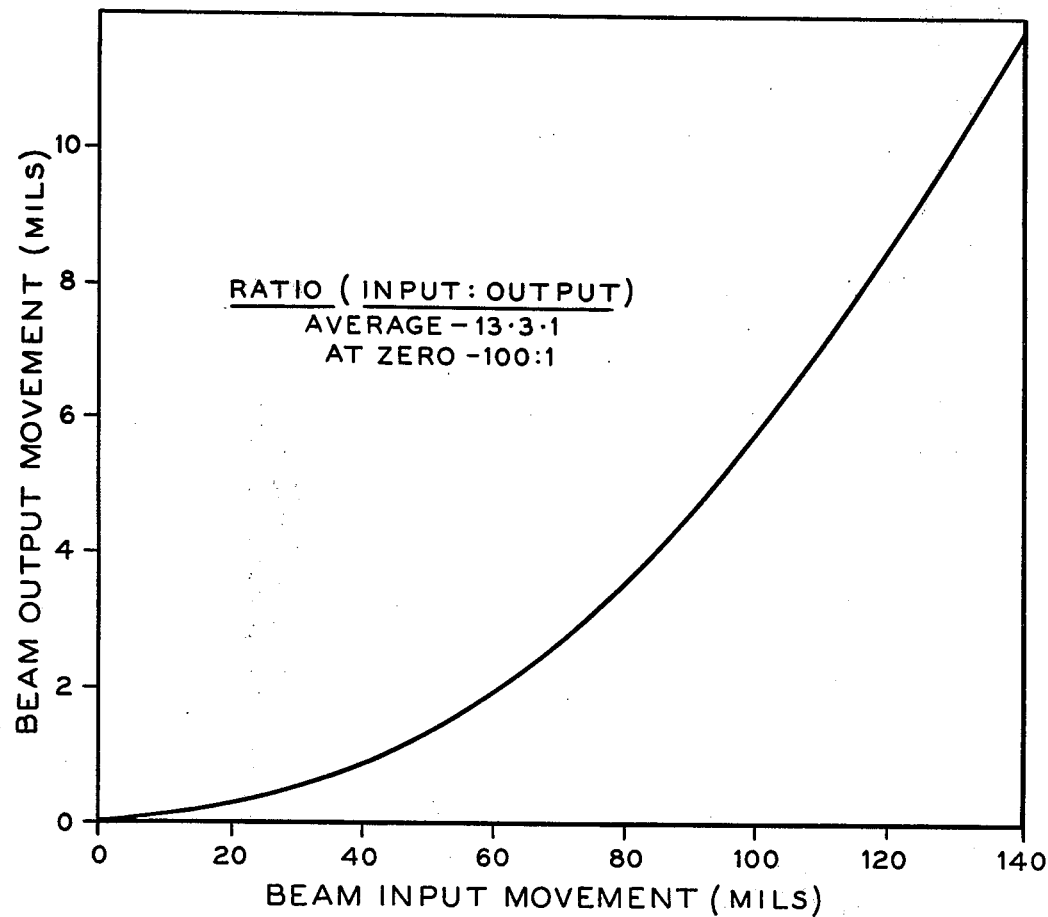
FIG. 9 is a graph showing the ratio between the input and output movements of the flexure beam.

The relationship between the amount of input movement to output movement is shown in the graph of FIG. 9. The beam input movement and the beam output movement is shown in mils.

Another embodiment of the positioning mechanism of the present invention is illustrated in FIG. 10. This embodiment utilizes output members 51 attached in some convenient fashion such as rivets 52 to the flexure beam members 54 which are guided by guides 56. In this embodiment the input force is provided in a turnbuckle bolt 58 consisting of two oppositely directed threaded portions 60, 62 and a thumbwheel 64. The threaded portions 60, 62 have a threaded relationship with the presser feet 66 and 68. The presser foot 68 has curved or contoured outer surfaces in engagement with the flexible beam members.

The full line and phantom line illustrations in FIG. 10 show the straight line maximum length of the flexure beams (phantom line) and minimum length of the flexure beam (full line).

FIGS. 11 and 12 illustrate another embodiment of the invention having different input mechanism for providing the input force to deflect a pair of flexure beams.

in the FIGS. 11 and 12 embodiment there is provided a stationary micrometer bolt 70 which is threadedly attached to the base member 6. A locknut 72 secures the bolt in relation to the base.

In threaded engagement with the bolt 70 is a barrel 76 which is interiorly and exteriorly threaded at 73 and 75. The barrel 76 has a flange 71 which is positioned in a recess 78 in the base member 6.

Threaded to the exterior of the barrel 76 and located within the recess 78 of the base member 6 is a back-up plate 80. Located between the back-up plate 80 and the flange 71 is a thrust bearing 82.

Positioned in engagement with the pair of flexible beam members 18A and 18B is a presser plate or foot 84 having a curved lower surface 86. Above the presser plate 84 is another thrust bearing 88 which is in face-to-face engagement with a washer 90.

In threaded engagement with the outside threads on the barrel 76 is a locknut 92 for maintaining the washer and presser plate in contact with the flexure beams 18A and 18B.

The deflection of the flexure beams is controlled by internally threaded micrometer-like dial member 94 having measuring indicia 98 therein having a gripping flange or wheel 96. Rotation of the dial member 94 in one direction will result in movement of the presser plate 84 downwardly, which is shown in full lines in FIG. 12. Rotation of the dial member 94 in the opposite direction will cause the presser foot and the flexure beam to move upwardly as shown in phantom lines.

This form of the invention gives very precise control of the flexure beams' deflection which can be easily repeated due to the dial measuring indicia.

Due to the fact there is a positive connection by virtue of the presser plate 84 and the back-up plate 80 between the dial member and the flexure beam controlling the downward and upward movement is strictly controlled and there is no need for a return spring.

In this embodiment the output member is connected to the flexure beams by any convenient connecting means such as bolts 102. While this embodiment is shown in connection with a pair of flexure beams, it will be understood that the input mechanism herein described could be used in connection with a single flexure beam.

What is claimed is:

1. A positioning mechanism comprising:
   (a) a stationary base member;
   (b) means including contoured blocks on said base in spaced apart relationship, said blocks being contoured so that the upper surfaces thereof curve toward one another;
   (c) a flexure beam positioned on the upper surfaces of said contour blocks;
   (d) means fixedly attaching one end of said flexure beam to one of said contour blocks, the other end of said flexure beam being a free end and extending beyond the other contour block;
   (e) means limiting the movement of the free end of said flexure beam to rectilinear movement;
   (f) means located between said contour block for flexing said flexure beam to thereby cause rectilinear movement of said free end of the flexure beam.

2. A positioning mechanism as defined in claim 1 wherein:
   (a) said means for flexing said flexure beam includes a presser foot having a convex surface adapted to engage said flexure beam.

3. A positioning mechanism as defined in claim 2 wherein:
   (a) said presser foot has a length in the direction of said flexure beam which is substantially equal to the space between said contour blocks.

4. A positioning mechanism as defined in claim 3 wherein said means for flexing said beam includes:
   (a) a cam having an operating handle, said cam being operatively associated with said presser foot to cause movement of said presser foot.

5. A positioning mechanism as defined in claim 4 wherein:
   (a) said presser foot includes guide means for guiding said cam with respect to said presser foot.

6. A positioning mechanism as defined in claim 5 wherein said presser foot moves in a direction substantially only normal to said flexure beam.

7. A rectilinear positioning mechanism comprising:
   (a) an output member including at least one relatively thin laterally flexible beam;
   (b) means cooperating with said flexible beam member for limiting movement of at least one end of said flexible beam to rectilinear movement;
   (c) supporting means having surface engagement with one side of said beam at two spaced apart locations along its length;
   (d) an input force member, said input force member including a presser foot having a curved convex surface formed on a relatively large radius, said convex surface being in engagement with said flexible beam on the side opposite from said supporting means so that there will be increasing surface contact between said presser foot and said flexible beam as said presser foot moves in a direction toward said flexible beam, said presser foot having a length in the direction of said flexible beam which is substantially equal to the distance between said spaced apart locations where the supporting means engages said flexible beam member; and
   (e) operating means operatively associated with said input member and said presser foot for applying force to said presser foot to gradually deflect said flexible beam to cause rectilinear movement of said flexible beam so that the position of said end can be gradually changed.

8. A positioning mechanism as defined in claim 7 wherein said input member consists of a cam having an operating lever.

9. A positioning mechanism as defined in claim 7 wherein said input member includes at least one presser foot and at least one threaded means in operative association with said presser foot, said presser foot being in engagement with said flexible beam to cause deflection of said presser beam.

10. A positioning mechanism as defined in claim 7 wherein there are a pair of flexible beam output members and there is one input force member for engaging both said flexible beam members.

11. A positioning mechanism as defined in claim 7 wherein said input force member consists of a turnbuckle bolt having threaded end portions positioned between said flexible beams, a thumbwheel in the center of said threaded bolt and presser feet threadedly connected to the threaded bolt end and in operative association with said flexible beams.

12. A positioning mechanism as defined in claim 7 wherein said input force member consists of a threaded bolt, a barrel member having interior and exterior threads and a dial member in threaded engagement with said barrel member.

13. A rectilinear positioning mechanism as defined in claim 7 wherein:
   (a) said presser foot moves in a direction substantially only normal to said flexible beam.

14. A rectilinear positioning mechanism adapted to accurately locate a member throughout a range of positions comprising:
   (a) a base member;
   (b) a longitudinally extending beam member flexible in the lateral direction;
   (c) supporting means on said base member having surface engagement with one side of said beam member at two spaced apart locations along its length;
   (d) means for fixedly positioning one end of said beam member with respect to said base member, the other end being free;
   (e) means for constraining said free end of said flexible beam so that it can move only rectilinearly;
   (f) means for engaging said beam member on the opposite side of said beam member from said supporting means with surface engagement between said supporting locations, said means having a length in the direction of said flexible beam substantially equal to the distance between said spaced apart locations; and (g) operating means associated with said engaging means to gradually apply force to said engaging means to gradually move said free end rectilinearly so that said free end can be located throughout a range of positions.

* * * * *